United States Patent [19]

Lepert

[11] 4,400,980

[45] Aug. 30, 1983

[54] METHOD AND DEVICE FOR DETECTING CHANGES IN THE MECHANICAL STATE OF THE MEMBERS OF A STRUCTURE IMPLANTED IN THE SEA

[75] Inventor: Philippe R. Lepert, Marseille, France

[73] Assignee: Syminex [Societe Anonyme], Marseille, France

[21] Appl. No.: 297,913

[22] Filed: Aug. 31, 1981

[30] Foreign Application Priority Data

Sep. 12, 1980 [FR] France .............................. 80 19883

[51] Int. Cl.³ ....................... G01H 13/00; G01M 7/00
[52] U.S. Cl. ......................................... 73/579; 73/584;
                                                    73/665; 181/121
[58] Field of Search .......................... 73/579, 584, 665;
                                                    181/121, 119

[56] References Cited

U.S. PATENT DOCUMENTS

| 3,345,861 | 10/1967 | Heath .................................... 73/584 |
| 4,128,011 | 12/1978 | Savage ................................... 73/579 |
| 4,147,228 | 4/1979 | Bouyoucos ......................... 181/119 |
| 4,231,259 | 11/1980 | Thiruvengadam et al. .......... 73/584 |
| 4,284,165 | 8/1981 | Airhart et al. ...................... 181/119 |

Primary Examiner—Howard A. Birmiel
Attorney, Agent, or Firm—Bucknam and Archer

[57] ABSTRACT

The invention relates to a method and device for detecting changes in the mechanical state of the members of a structure implanted in the sea, whereby each member is subjected to impacts and after each impact, the simultaneous signals of excitation and dynamical response of the member are recorded, the signals of identical frequency being processed in order to define a ratio which varies with the frequency and presents peaks. The aforesaid operations are repeated at regular intervals, a watch being kept for any shifts in the peaks which could indicate a change in the structure.

8 Claims, 2 Drawing Figures

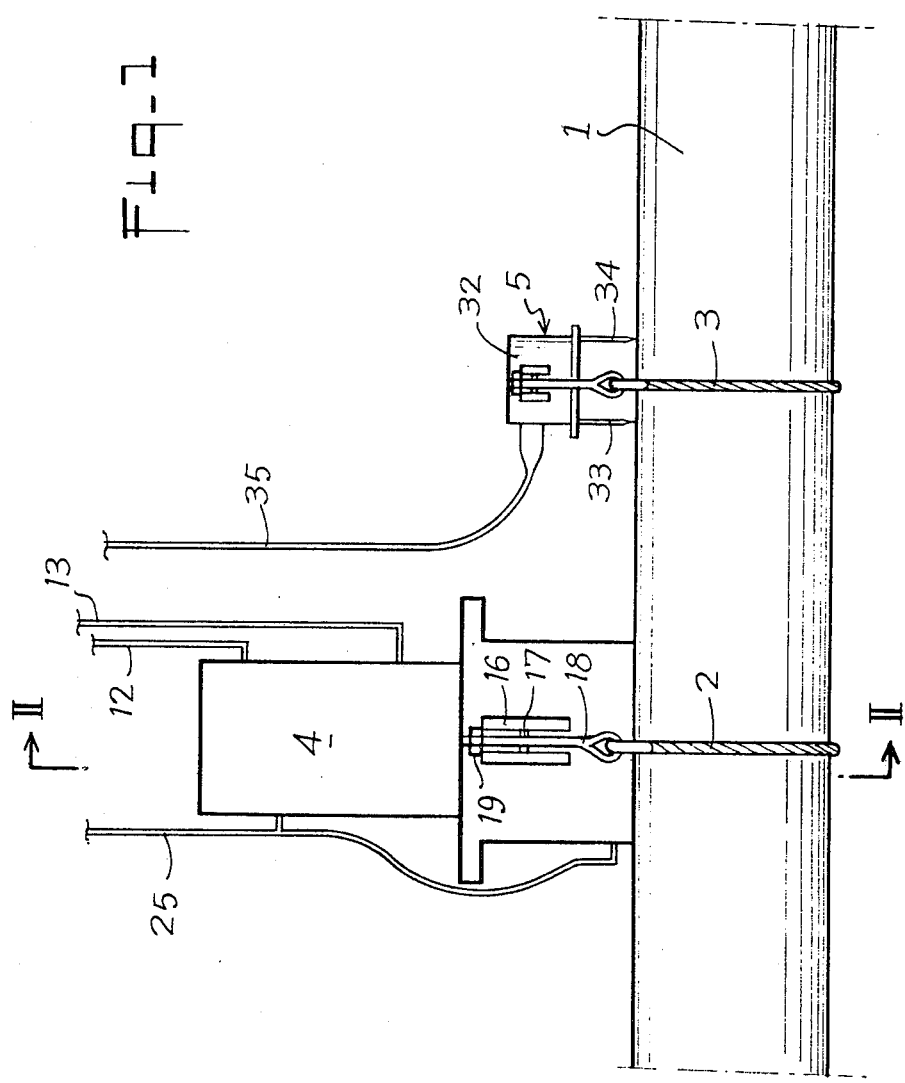

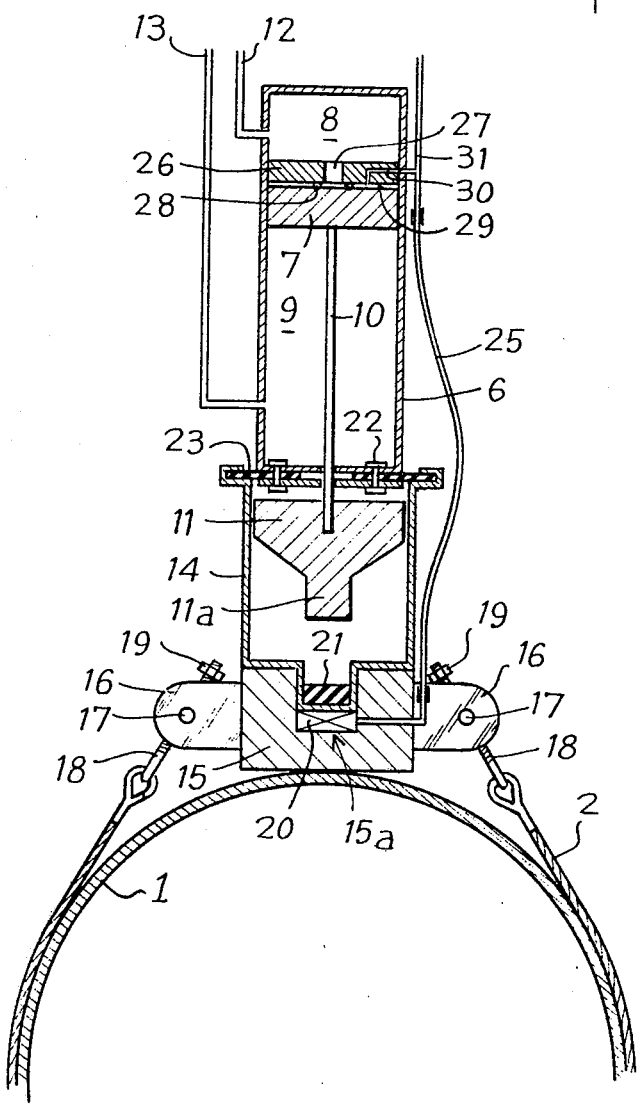

METHOD AND DEVICE FOR DETECTING CHANGES IN THE MECHANICAL STATE OF THE MEMBERS OF A STRUCTURE IMPLANTED IN THE SEA

The invention relates to methods and devices for detecting changes in the mechanical state of the members of a structure implanted in the sea, and in particular immersed members.

The term member is used in its general meaning to designate the different elements of a structure which may be composed of girders, section irons, tubes or bars.

The technical field of the invention is that of the construction of devices for controlling the mechanical state of structures, such as for example sea platforms.

Methods are known for checking structures for vibrations, which consist in mechanically exciting a structure in specific and perfectly reproducible conditions, measuring each time the exciting signals and the dynamical response of the different elements of the structure, processing these measurements to deduct therefrom a transfer function which is a ratio of the response signal to the exciting signals, and repeating these measurements at intervals.

If large enough cracks have appeared on a girder, the transfer function of the girder is changed and the change depends on the size and location of the defect. The regular repetition of the measurements at intervals makes it possible to detect the cracks before they increase and can seriously affect the mechanical strength of the structure.

A particularly advantageous application of these methods is the periodical control of the mechanical state of immersed metallic structures supporting oil rigs or drilling platforms subjected to an aggressive surrounding medium either by corroding, or by fatigue due to the repeated action of the swell. Serious accidents are known to have happened in which such platforms have broken down or capsized, and it is most important to find methods and devices that are efficient and as inexpensive as possible to control regularly the mechanical state of these structures and thus prevent accidents, ensure the safety of the personnel on board and prevent any serious risks of sea pollution.

A brief indication of the theoretical bases of the methods according to the invention for dynamically controlling structures is given with a view of specifying the terms used.

When one or more successive shocks or perturbations are applied to a structure by a source of mechanical excitation, the structure is subjected to damped vibrations and a dynamical excitation signal f(t) can be measured during a time interval T, which signals varies and can be for example a pressure, a force or a movement, and a dynamic response signal x (t) which may be for example an acceleration, a speed, a shift or a position.

The time T is long enough for the excitation and response signals to be completely damped.

The structure can be excited overall and the response of certain members can be measured individually.

According to one characteristic feature of the methods according to the invention, each member to be tested is excited individually and locally by subjecting it to impacts.

The response signal of a member depends on the point at which it is measured.

According to another characteristic feature of the invention, the response of one member is measured advantageously in the same point, or in a point very close to the point, where the member is excited.

The dynamic signals of excitation f(t) and of response x(t) are processed to obtain a transfer function.

According to the invention, first a FOURIER transform is applied to the excitation and response signals, that is to say that for every frequency $\omega$, the following complex functions are calculated:

$$F(\omega) = \int_0^T f(t)e^{-j\omega t}dt$$

and $$X(\omega) = \int_0^T x(t)e^{-j\omega t}dt \text{ with } j^2 = -1, \text{ as well as}$$

as well as conjugated functions $\overline{F}(\omega)$ and $\overline{X}(\omega)$.

Then are calculated:

The function $S_{FF}(\omega) = F(\omega) \cdot \overline{F}(\omega)$ known as autospectrum of excitation, and the function $S_{XF}(\omega) = F(\omega) \cdot \overline{X}(\omega)$ known as excitation-response crossed spectrum.

Finally a transfer function $H(\omega)$ equal to the ratio $SXF(\omega)/SFF(\omega)$ is defined.

The transfer function $H(\omega)$ is a complex function which is dependent on the frequency and of which the modulus has a maximum or peak for each fequency corresponding to a resonance of the structure member of which the response is being measured.

A mechanical defect, such as for example a crack, appearing on a structure member causes a progressive change in the natural frequencies which change causes the peaks of the transfer function to shift.

The dynamical control methods have so far been used by subjecting the entire structure to one or more mechanical impacts or perturbations and by measuring the responses of the different members of the structure. With this method, the excitation must have sufficient energy to shake the whole structure.

To shake the whole of an aerial structure resting on the ground, a hydraulic jack, resting on one fixed point anchored in the ground is used, which jack applies a variable force to the structure. Such an apparatus cannot be used at sea.

Another jack has also been used, one part of which is integral with the structure to be excited, while the other part is integral with a movable mass. The jack imposes a relative movement between the movable mass and the structure and exerts on the latter a variable force due to the effect of inertia of the movable mass. In order to obtain sufficient force to shake the whole structure, it is necessary to use a heavy movable mass, weighing between 1,000 and 3,000 kg. The weight and overall dimensions of such an apparatus makes it unusable under water to check immersed structures.

An object of the present invention is to propose relatively light and inexpensive means to readily effect frequency measurements of excitation and dynamical response on the different elements of a structure and in particular of an immersed structure, and to accurately locate those members of the structure on which defects have appeared which could seriously affect the solidity of the structure.

A further object of the invention is to propose excitation devices and devices for measuring the excitation and response signals of certain members of an immersed structure, reasonably sized and inexpensive to produce so that they can be permanently fitted on the elements to be checked and that the excitations and measurements are done always in the same points and in perfectly identical conditions. Also with this solution the excitation and measurment devices are connected to the surface and a checking means is always available on platforms, to conduct frequent checks without high costs being involved since there is no longer the need to call on the services of divers to go under water to fit the measuring devices on the different members of the structure every time a control has to be made.

A method according to the invention for detecting any alterations in the mechanical state of the members of a structure situated in the sea, and in particular immersed members, consists in the following operations:

each member is excited individually in one point by subjecting it to impacts;

after each impact, the excitation signals and the dynamical response signal are recorded simultaneously for each member over a long enough period for them to be completely damped;

the simultaneous excitation and response signals having the same frequency are processed and a ratio is defined, which ratio varies with the frequency and presents peaks corresponding to the natural frequencies of resonance of the member;

the same operations are repeated at regular intervals, a watch being kept for any variations in the peak frequencies which would indicate a change in the mechanical state of the member.

A device according to the invention for detecting changes in the mechanical state of the members of a structure implanted in the sea; immersed members in particular, comprises:

a device for mechanically exciting the said member, which is rigidly secured in one point of the latter and comprises means for applying impacts to said member;

a first pick-up, incorporated to the said impact-applying means, which picks up the force of the impacts to which the member is subjected;

a second pick-up secured to the same member which picks up the dynamical response signals from the member;

means for simultaneously recording the signals delivered by the pick-ups after each impact, over a long enough period for them to be damped and means for processing the signals with a view to defining a ratio between the simultaneous signals, which ratio varies with the frequency and presents peaks which correspond to the natural frequencies of resonance of the member.

Preferably, the mechanical excitation device comprises a double-acting jack whose piston is connected by a rod to a weight or hammer head situated inside a gas-filled sealed housing, which housing is rigidly secured to the member.

According to a preferred embodiment of the invention, the base of the sealed housing rests on an anvil which is rigidly secured to the member, which anvil is provided with a central well at the bottom of which is placed an excitation pick-up and the weight comprises a projecting hammer which penetrates into the said well.

Advantageously, damping means are inserted between the hammer and the excitation pick-up.

According to a preferred embodiment, the jack is a pneumatic jack and its cylindrical body comprises a partition against which abuts the piston when in the rest position, the partition is traversed by an orifice of small cross-section, an O-ring surrounding the orifice, and when the piston is in abutment against the ring, an intermediate space is left between the piston and the partition and the ring seals the intermediate space from the said orifice.

As a result of the invention, it becomes possible to detect cracks or defects in the different members composing a structure, and in particular an immersed metallic structure, by observing the evolution of the dynamical response of the structure to a pinpoint and individual dynamical excitation.

One advantage of the invention resides in the fact that the excitation and measuring devices used, form a relatively light assembly, small enough to be handled under water.

The devices according to the invention are of easy maintenance and very reliable. Moreover, their manufacturing cost is relatively low so that it is possible for each member requiring supervision, to be permanently equipped with one device, this permitting to multiply the measurements.

The invention will be more readily understood on reading the following description with reference to the accompanying drawings in which:

FIG. 1 is an overall view of the device.

FIG. 2 is a cross-sectional view of FIG. 1 along line II—II.

FIG. 1 shows a member 1 of a structure which can be part of an immersed structure for example, composed of steel tubes joined together, and supporting an oil-drilling platform. On the tubes are rigidly secured, by means of collars 2 and 3, first a mechanical excitation device 4 and second, a dynamical response pickup 5. In the illustrated example, the response pick-up 5 is placed close to the excitor 4. It can also be contained in the same housing as said excitor 4.

FIG. 2 shows a cross-section on a larger scale of the mechanical excitation device 4 fitted on a tubular member 1 by means of a collar 2.

The device 4 comprises a jack, which is preferably a double-acting pnuematic jack composed of a cylindrical body 6 and of a piston 7, both of which define two chambers 8 and 9 separated by the piston. The piston 7 is connected via a rod 10 to a mass or hammer head 11 weighing several scores of kilogrammes. The two chambers 8 and 9 are connected respectively, via flexible conduits 12 and 13, to a control valve which supplies one of the chamber with compressed air whilst the other is slightly pressurized, for example at the ambient atmospheric or hydrostatic pressure. This control valve enables to reverse the pressures. The hammer head 11 is for example of cylindrical shape and moves axially inside a sealed cylindrical housing 14 which guides it and is filled with air or gas. The bottom of the housing 14 rests on a block or anvil 15. The block 15 is provided on each one of its two faces parallel to the axis of the tube 1, with two parallel plates 16 forming a forked joint which supports an axle 17. Each axle 17 carries a threaded rod 18 which passes between the two plates and can pivot about the axle 17. A collar 2, constituted for example by a steel cable encircles the tube 1 and is joined by its two ends to the two threaded rods 18. Nuts 19 enable to tighten the collar and to lock the anvil 15 on the tube 1.

Obviously, the anvil can be locked on the said tube by any other means equivalent to the collar 2.

The anvil 15 comprises a central bore 15a at the bottom of which is placed a pick-up 20 which can be a power pick-up or a piezometric pressure pick-up. A pad 21 made of a damping material such as for example synthetic rubber, is provided on top of the pick-up 20. The hammer head 11 presents at its end facing the anvil a projecting part 11a which acts as a hammer, penetrates into the central bore 15a and thumps down on the pad 21 with a speed of between 5 and 5 m/sec. and a force of between 40 and 90 KN.

The role of the pad 21 is to filter the high frequencies and to concentrate the impact energy in the frequency band containing the resonance frequencies of the member 1, which are relatively low frequencies, generally below 50 Hz.

Another function of the pad 21 is to prevent the hammer head 11 from rebounding, which would interfere with the measurements.

The cylinder 6 of the jack is connected to the housing 14 by means of screws 22 or any other equivalent securing means with interposition of a layer 23 of supple material such as for example a layer of elastomer, which is meant to absorb any reactions that the body of the jack 6 could have on the housing 14.

The pick-up 20 is connected with the surface by way of a cable 25 which transmits the picked-up signals to an analog or digital recording device.

The jack 6 comprises a partition wall 26 which is provided with a central orifice 27.

When in the high position, the piston 7 abuts on the partition 26. An O-ring 28 is inserted in a groove on the upper face of the piston or in a groove on the lower face of the partition 26 and surrounds the orifice 27.

The space 29 situated between the top of the piston and the lower face of the partition 26 and which is on the outside of the O-ring 28 communicates via a capillary conduit 30 with a flexible lead 31, which is contained inside the same umbilical cable as the cable 25. The flexible lead 31 communicates with the surface and keeps the space 29 under low pressure when the piston 7 is immobilized in the high position.

The mechanical excitation device 4 works as follows:

At the start, the chamber 9 is under high pressure, the piston 7 abuts on the partition 26 and the hammer head is in the high position as shown in FIG. 1.

To mechanically excite the member 1, the control valve situated out of the water, is reversed so that the pressure increases progressively inside the chamber 8 and decreases inside the chamber 9. The piston is subjected to two antagonistic pressures.

Taking $S_M$ as the surface of the piston, $S_m$ as the cross-section of the orifice 27, $P_8(t)$ and $P_9(l)$ as the respective pressures at a moment t inside the chamber 8 and the chamber 9.

The piston will leave its abutting position on the partition 26 at a moment to wherein $P_8(to).S_m = P_9(to).S_M$. At a moment to $+\epsilon$, $\epsilon$ being a very small interval of time, the piston 7 is no longer resting against the partition 26, the O-ring 28 no longer ensures tightness and the pressure $P_8(t)$ is applied over the entire upper face of the piston, i.e. over a section $S_M$. The conduit 30 being of small cross-section, large quantities of compressed air cannot really escape through it in a very short time.

At that moment, the piston is suddenly subjected to a force directed downwards and which is equal to $S_M[P_8(t) - P_9(t)]$, and which is substantially equal to $P_8(t).(S_M - S_m)$.

Thus, if the surface $S_m$ of the orifice 27 is ten times smaller than the section $S_M$ of the piston, for a piston surface of about 100 cm2 and a high pressure of about 12 bars, the force which is suddenly applied to the piston is of the order of 10 KN.

If the total weight of the piston and of the hammer head is about 50 Kg, said hammer head 11 is propelled towards the anvil with an acceleration of about 200 m/s2 and therefore meets the anvil with a violent impact, which is communicated to the member 1 and shakes it.

The reaction of the jack body 6 during this phase is absorbed by the damping layers 23 and 24 so that the member 1 is only excited by the impact of the hammer head 11 on the anvil. The pick-up 20 which is situated between the hammer head and the anvil picks up the forces transmitted by the hammer head to the anvil and from there to the member, and the variable signal delivered by the pick-up therefore corresponds to the mechanical excitation of the member which is applied locally thereto.

It will be noted that provided that the compressed air is used everytime at the same pressure, the jack 6 which is provided with a partition 26 having an orifice 27 enables to apply the same acceleration every time to the hammer head and thus to excite every time the member 1 in the same conditions, this being essential to study the evolution of the response of the member. It is also to be noted that the excitation device 4 is a simple and inexpensive device, and that one such device can be permanently fitted on each member requiring control, this presenting the advantage of exciting the member in the same spot at each control, which is important if the differences in response are to be significant. Moreover, by leaving the appartus permanently on each member, it is possible to avoid calling on the expensive services of divers to install them every time a control is required, and frequent checks then become possible at low costs.

A device according to the invention further comprises a pick-up 5 designed to measure the dynamical response of the member 1 to the impact of the hammer head 11 on the anvil.

The pick-up 5 can be for example an accelerometer placed inside a sealed container 32 fixed to the tube 1 by way of a collar 3 similar to the collar 2. The accelerometer comprises spikes 33, 34 which are held in contact with the tube 1.

The spikes 33, 34 are preferably parallel to the axis of the jack 6 and detect any variations in the transverse acceleration of the tube in the direction parallel to the axis of the jack, which is the direction of the impact. The accelerometer 5 is connected with the surface by a cable 35 which relays the picked up signals to a processing apparatus or to an analog or digital recorder.

The accelerometer 5 could of course be replaced by any other type of dynamical pick-up such as speed, stress, pressure, shift or position detector.

The signals transmitted by the pick-up 5 are recorded over a specific period, several seconds, for example, which is longer than the period necessary to damp completely the response of the member 1 to the impact of the hammer head.

The pick-up 20 measures a variable excitation signal f(t) and the pick-up 5 simultaneously measures a variable response signal x(t).

Preferably, at each operation, successive impacts of the hammer head are initiated at intervals which are long enough for the response to each impact to have had time to damp completely and the excitation signals f(t) and response signals x(t) are averaged in order to facilitate the processing.

As indicated hereinabove, the processing consists in subjecting the signals to a FOURIER transform, this permitting to calculate the complex functions $F(\omega)$ and $X(\omega)$, after what the functions $S_{FF}(\omega)$ and $S_{XF}(\omega)$ are calculated as well as the transfer function $H(\omega)$ which is equal to the ratio of one of these two functions to the other, the modulus of which shows peaks which correspond to frequencies of resonance of the member 1. A large enough crack in that member will entail shifting of the peaks.

The method and device according to the invention, which consist in exciting each member of the structure individually, shows many advantages over the known methods and devices wherein the whole structure is excited.

The devices used are simple. They comprise only one movable part situated inside a sealed housing. They contain no sub-marine electronic circuit. This simplicity of the design makes them very reliable.

A device such as that used in the invention is perfectly safe from both sea pollution and personnel safety standpoints. There is absolutely no risk of sea pollution, should a hydraulic flexible pipe break and no risk of electrocution for the staff.

A device according to the invention requires little space and its apparent weight when immersed is very reduced if not nil, this making it easily transportable and fittable under water by divers.

In the event of sea water infiltrating accidentally into the apparatus, it only needs to be cleaned and dried, and can be used again.

The devices according to the invention have the advantage of only requiring very small additional equipments, i.e. a supply of compressed air which may be for example a cylinder of the type used in skindiving, a relief-valve, and a reversing valve permitting to release the impact.

What is claimed is:

1. A method for detecting changes in the mechanical state of the immersed members of a structure at sea which consists of the steps of:
    (a) exciting individually a point of each member by subjecting it to impacts;
    (b) after each impact, measuring and recording to excitation signal;
    (c) simultaneously measuring and recording the dynamic response signal in said excited point or in a point very close to said excited point;
    (d) processing the simultaneous excitation and response signals to extract therefrom signals having the same frequencies and to define a ratio between simultaneous excitation and response signals having the same frequency, which ratio varies with the frequency and presents peaks corresponding to the natural frequencies of resonance of said member;
    (e) and repeating said operations at time intervals and watching for any shifting of said resonance frequencies which indicates a change in the mechanical state of said member.

2. A device for detecting changes in the mechanical state of an underwater member of a structure at sea comprising:
    a device which is rigidly secured in one point of said member and which comprises means for applying impacts to said point;
    a first pick-up element (20), incorporated into said impact-applying means, which element picks up the force of the impacts to which said member is subjected;
    a second pick-up element (5), which is rigidly secured to said member very close to said point and which picks up the dynamic response signals from said member;
    means for simultaneously recording the signals delivered by said pick-up elements after each impact, over a long enough period for them to be damped; and
    means for processing said recorded signals in order to extract signals having the same frequencies and to define a ratio between simultaneous force and response signals having the same frequency, which ratio varies with the frequency and presents peaks which correspond to the natural frequencies of resonance of said member which frequencies are shifted when the mechanical state of said member changes.

3. A device as claimed in claim 2, wherein said means for applying impacts to said point comprises a double-acting jack having a piston and a hammer which is placed inside a gas-filled sealed housing rigidly secured to said underwater member and which is connected by a rod to said piston.

4. A device as claimed in claim 3, wherein damping means are inserted between the hammer and the first pick-up element.

5. A device as claimed in claim 3, wherein the said jack is a pneumatic jack and its cylindrical body comprises a partition against which abuts the said piston when in the rest position, said partition is traversed by an orifice of small cross-section an O-ring surrounding the said orifice and when the piston is in abutment against the said ring, an intermediate space is left between the piston and the said partition and the said ring seals the said intermediate space from the said orifice.

6. A device as claimed in claim 5, wherein the said partition divides the jack body into two chambers, each one of which is connected to means permitting to send a compressed gas in one of the chambers and to simultaneously place the other chamber under low pressure.

7. A device as claimed in claim 2, wherein said means for applying impacts to said point comprises a double-acting jack having a piston, a hammer which is placed in a gas-filled sealed housing and which is connected by a rod to said piston and an anvil, which is interposed between the base of said housing and said underwater member to which it is rigidly secured and which is provided with a central well at the bottom of which is placed said first pick-up element and said hammer head comprises a projecting head which penetrates into said well.

8. A method for detecting changes in the mechanical state of the immersed members of a structure at sea which comprises the following steps:
    exciting individually a point of each member by subjecting it to impacts;
    during and after each impact measuring and recording the excitation signal;
    simultaneously measuring and recording the vibration response signal in said excited point or in a point very close to said excited point;

processing the simultaneous excitation and response signal in applying to each of them a Fourier transformation, in calculating the auto-spectrum of excitation, the excitation-response crossed spectrum and a transfer function which is the ratio between said crossed spectrum and said auto-spectrum and in calculating the modulus of said transfer function versus frequency which presents peaks corresponding to the natural frequencies of resonance of said member;

and repeating the same operations at time intervals and watching for any shifting of said resonance frequencies which indicates a change in the mechanical state of said member.

* * * * *